United States Patent [19]
Ellis

[11] 4,345,585
[45] Aug. 24, 1982

[54] SOLAR HEATING APPARATUS

[75] Inventor: Victor C. Ellis, La Ronge, Canada

[73] Assignee: Sun-Woods Engineering Ltd., Saskatchewan, Canada

[21] Appl. No.: 167,217

[22] Filed: Jul. 9, 1980

[51] Int. Cl.³ ............................................. F24J 3/02
[52] U.S. Cl. .................................. 126/429; 126/445; 126/449
[58] Field of Search ............... 126/449, 429, 444, 445, 126/450, 417, 448

[56] References Cited

U.S. PATENT DOCUMENTS

| | | | |
|---|---|---|---|
| 4,090,494 | 5/1978 | Borst et al. | 126/445 |
| 4,135,491 | 1/1979 | Koizumi et al. | 126/429 |
| 4,286,583 | 9/1981 | Dunn et al. | 126/445 |

Primary Examiner—Daniel J. O'Connor
Attorney, Agent, or Firm—Emory L. Groff, Jr.

[57] ABSTRACT

A solar heat collector includes a rectangular casing with a plurality of heating chambers in the front thereof, each heating chamber containing a plurality of louvered metal heat exchange fins for receiving solar heat. Air from stone containing silos blows through the chambers from a common air inlet manifold, and is returned to the silos via a common air discharge manifold.

2 Claims, 13 Drawing Figures

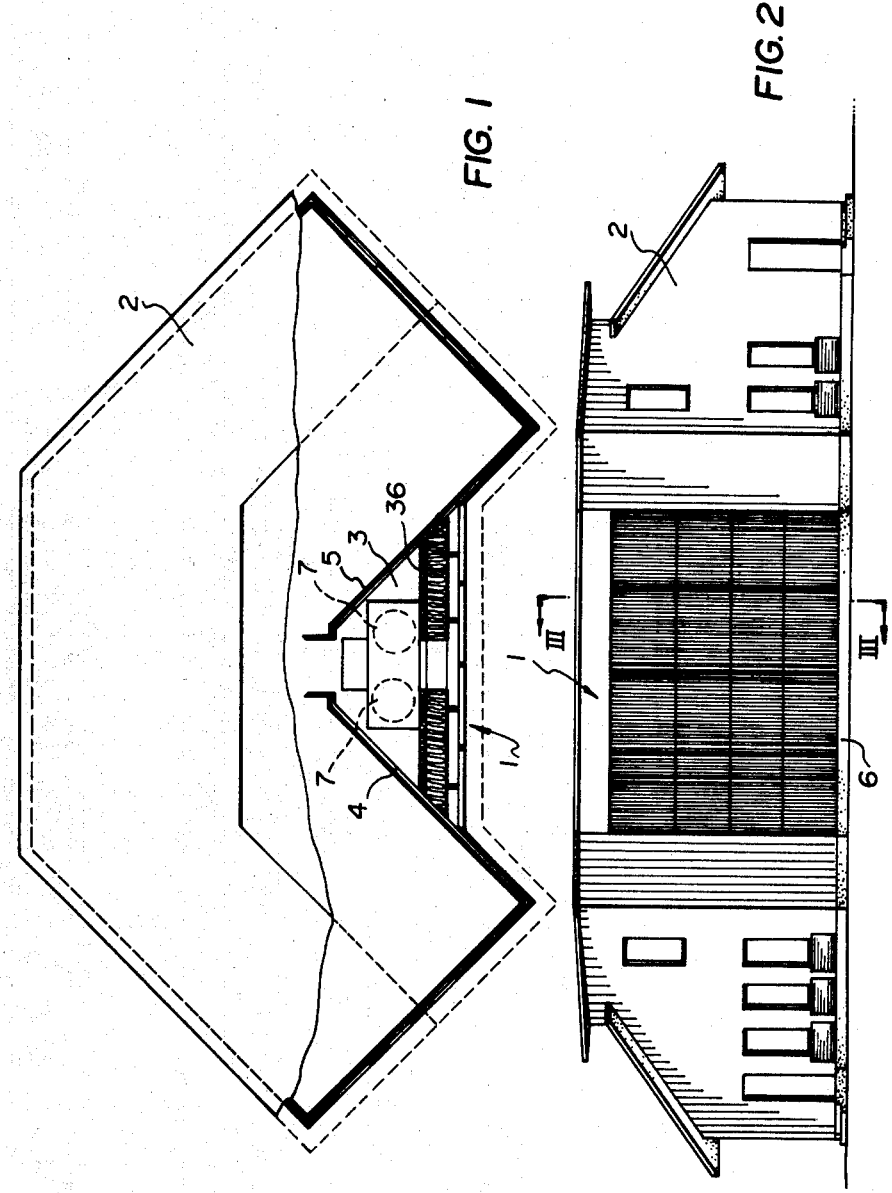

SOLAR HEATING APPARATUS

BACKGROUND OF THE INVENTION

1. Field of the Invention

This invention relates to a solar heating device and in particular to a solar heat collector for use in a solar heating apparatus of the type which utilizes air as the heat transfer medium.

2. Discussion of Prior Art

The basic elements of conventional hot air solar heating systems include air ducts or pipes for circulating air from heat collecting panels or other heat collectors through a container of rocks where the heat is stored and back through the heat collectors. Separate ducts or plenums carry heated air to the various parts of the building containing the solar heating unit. Such solar heating systems or elements thereof are disclosed, for example in U.S. Pat. Nos. 2,484,127, issued to W. Stelzer on Oct. 30, 1944; 2,559,871, issued to F. W. Gay on July 10, 1951; 2,680,565, issued to G. O. G. Lof on June 8, 1954; 3,243,118, issued to E. A. Morgan on Mar. 29, 1966; 3,412,728, issued to H. E. Thomason on Nov. 26, 1968; issued to J. H. Keyes et al on July 15, 1975; 3,902,474, issued to D. L. Pyle on Sept. 2, 1975; 3,946,721, issued to J. H. Keyes et al on Mar. 30, 1976; 3,994,276, issued to D. W. Pulver on Nov. 30, 1976; 4,006,856, issued to K. N. A. Nilsson on Feb. 8, 1977; 4,016,861, issued to M. F. Taylor on Apr. 12, 1977; 4,029,258, issued to G. F. Groth On June 14, 1977; 4,076,013, issued to J. A. Bette on Feb. 28, 1978; 4,088,266, issued to J. H. Keyes on May 9, 1978; 4,095,997, issued to K. F. Griffiths on June 20, 1978; 4,108,155, issued to H. Koizumi et al on Aug. 22, 1978; 4,137,898, issued to H. Koizumi et al on Feb. 6, 1979; 4,139,321, issued to F. D. Werner on Feb. 13, 1979; 4,141,339, issued to A. Weinstein on Feb. 27, 1979; 4,144,871, issued to D. F. Porter on Mar. 20, 1979; and 4,147,300, issued to W. W. Milburn, Jr. on Apr. 3, 1979.

The devices disclosed by the above-identified prior art vary in terms of both efficacy and complexity. From at least some of the patents, it is readily apparent that a need exists for a simple solar heat collector for efficiently collecting solar heat. The object of the present invention is to provide a simple, relatively inexpensive, effective solar heat collector.

Accordingly, the present invention relates to a solar heat collector for use in a solar heating apparatus of the type which utilizes air as a heat transfer medium comprising a casing defined by front, rear and side walls, the front wall being adapted to transmit solar heat to the interior of the casing, an intermediate wall extending between the side walls; first partitions interconnecting said front and intermediate walls and dividing the area between said walls into a plurality of heating chambers; second partitions extending between said intermediate and rear walls and dividing the area between said walls into an air inlet manifold and an air discharge manifold; a cold air inlet in said rear wall for introducing air into said air inlet manifold; air inlet openings in said intermediate wall connecting each heating chamber to said air inlet manifold; air outlet openings in said intermediate wall connecting each heating chamber to said air discharge passage; and a plurality of heat exchange fins in said heating chambers for receiving solar heat and transferring such heat to air passing from the air inlet opening to the air outlet opening in each heating chamber.

BRIEF DESCRIPTION OF DRAWINGS

FIG. 1 is a partly sectioned plan view of a building incorporating a solar heat collector in accordance with the present invention;

FIG. 2 is an elevation view of the building of FIG. 1;

It should be noted that many details have been omitted from some of the drawings to avoid unnecessary cluttering of the drawings.

DESCRIPTION OF PREFERRED EMBODIMENT

STRUCTURE

With reference to the drawings and in particular FIGS. 1 and 2, a solar heat collector generally indicated at 1 is installed on one side of a building 2. Of course, in North America the solar collector 1 preferably has a clear southern exposure to ensure maximum solar heating.

Figure 4:
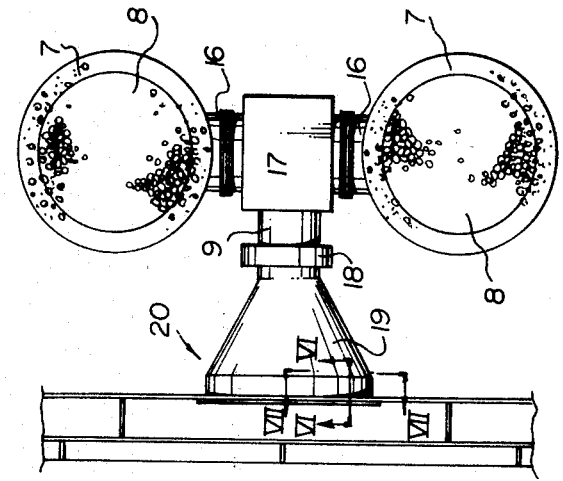
FIG. 4 is a cross-sectional view taken generally along line IV—IV of FIG. 3.
Figure 3:
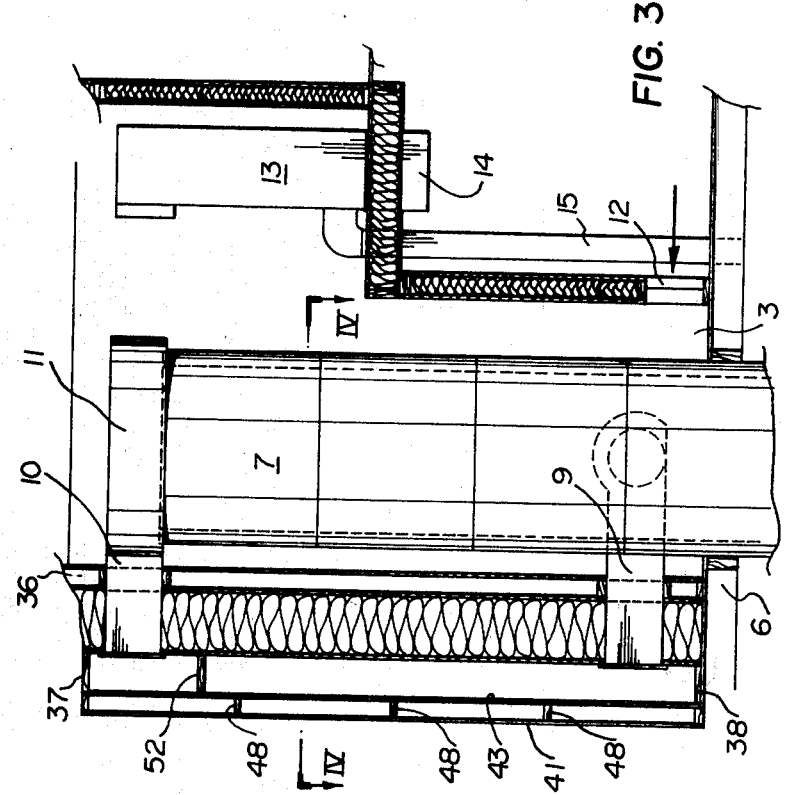
FIG. 3 is a cross-sectional view taken generally along line III—III of FIG. 2.
Figure 6:
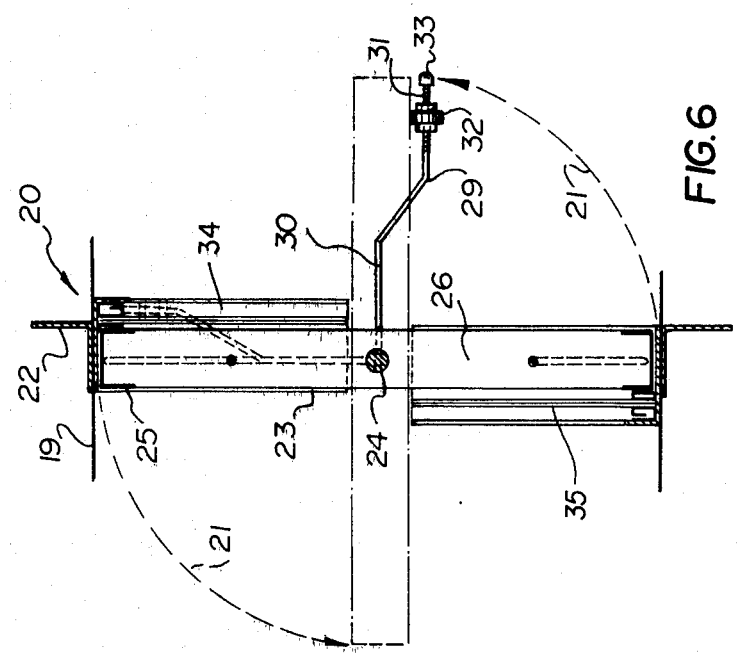
FIG. 6 is a cross-sectional view of a damper taken generally along line VI—VI of FIG. 4.
Figure 5:
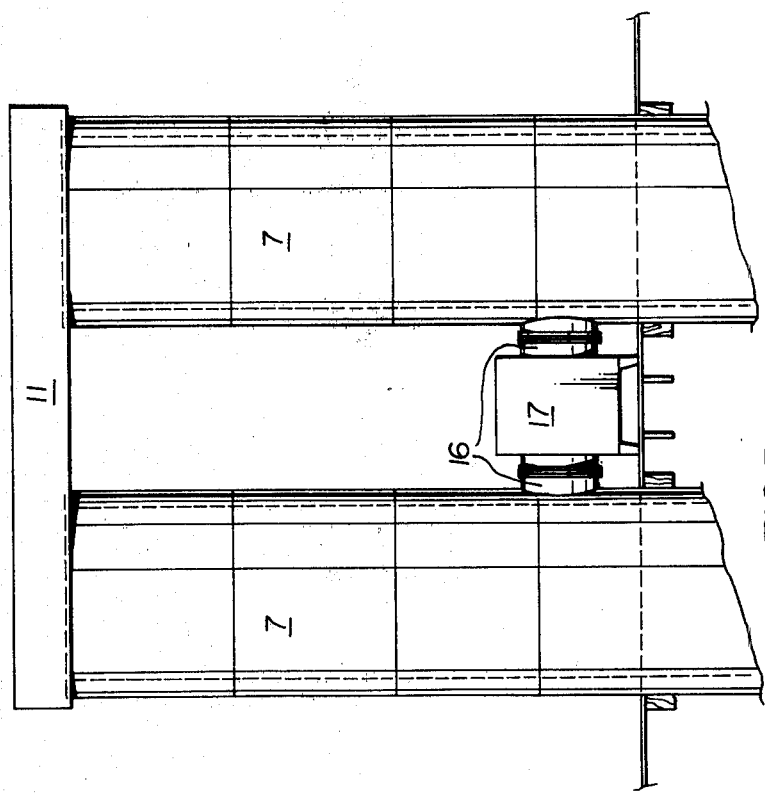
FIG. 5 is a rear elevation view of heat storage silos illustrated in FIGS. 3 and 4.
Figure 7:
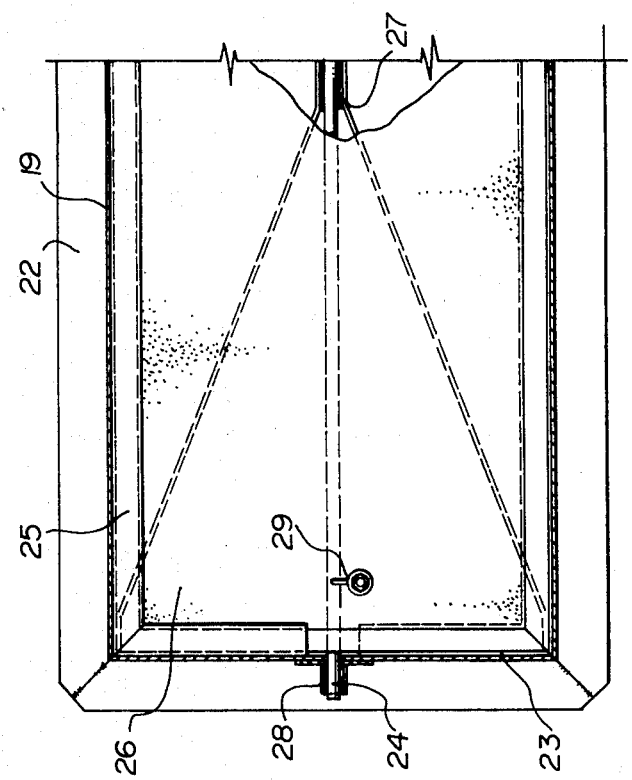
FIG. 7 is a section view of one end of the damper taken generally along line VII—VII of FIG. 4.

The solar heating system incorporating the solar collector 1 includes a chamber 3 defined by the collector 1, walls 4 and 5 of the building, a base 6 and a cover or roof (not shown). Heat storage silos 7 containing stones 8 (FIG. 4) are housed in the chamber 3. The silos 7 are connected to the bottom of the solar collector 1 by a cold air return duct 9 and to the top of the solar collector by a hot air duct 10. Air is circulated from the bottom of the silos 7, through the duct 9 and the heat collector 1 for heating, into the top of the silos 7 via the duct 10 and a manifold 11 and through the stones 8 for heating the latter. Building air to be heated is drawn into the chamber 3 via an inlet 12, and is discharged into the building 2 via an electric furnace unit 13 and a plenum 14. The furnace 13 is also equipped with a cold air return duct 15 passing through one wall of the chamber 3.

Referring specifically to FIGS. 3 to 7, air from the bottom of the silos 7 is drawn through ducts 16 into a fan 17, which blows the air through the duct 9, a dehumidifier 18, and a duct 19 containing an automatic damper generally indicated at 20 into the solar collector 1 for heating. The automatic damper 20 (FIGS. 6 and 7) is, in effect, a flap valve opening in the direction of arrows 21 in response to air pressure from the fan 17. The damper 20 includes a rectangular exterior angle frame 22 on the duct 19, in which a damper plate 23 is pivotally mounted for rotation around a horizontal axis defined by a shaft 24 between the open and closed positions (broken and solid lines, respectively in FIG. 6). The damper plate 23 is defined by a light aluminum frame 25 of generally U-shaped cross-sectional configuration surrounding an insulated centre panel 26. The shaft 24 extends through a centre bearing 27 in the panel 26 between bearings 28 (one shown) on each side of the frame 22. An adjustable counterweight 29 extends outwardly from one side of the panel 26. The counterweight 29 is defined by a stepped rod 30 connected at its inner end to the shaft 24. Outer end 31 of the rod 30 is threaded for receiving a weight 32, which can be moved along such threaded end of the rod. A rubber bumper cap 33 is provided on the outer free end of the rod 30. Gaskets 34 and 35 of the magnetic refrigeration door gasket type provide seals when the damper is closed.

Figure 12:
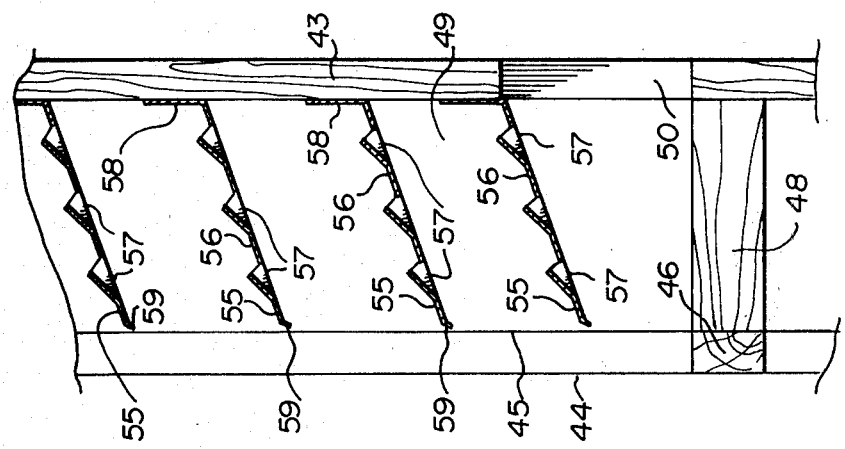
FIG. 12, which appears on the fourth sheet of drawings with FIG. 7, is a cross-sectional view of the solar collector taken generally along line XII—XII of FIG. 8 on a scale even larger than that of FIG. 11.
Figure 8:
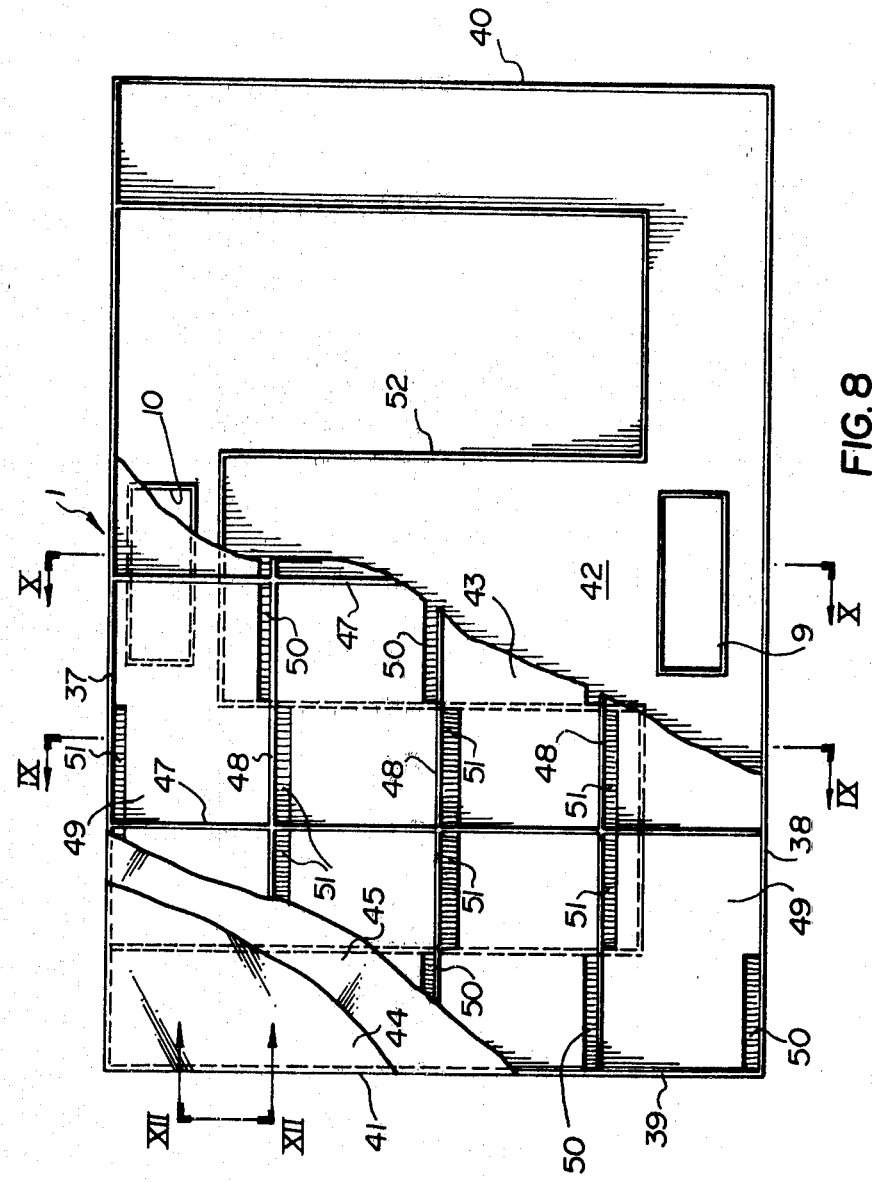
FIG. 8 is a predominantly sectioned, elevation view of a solar collector in accordance with the present invention.
Figure 9:
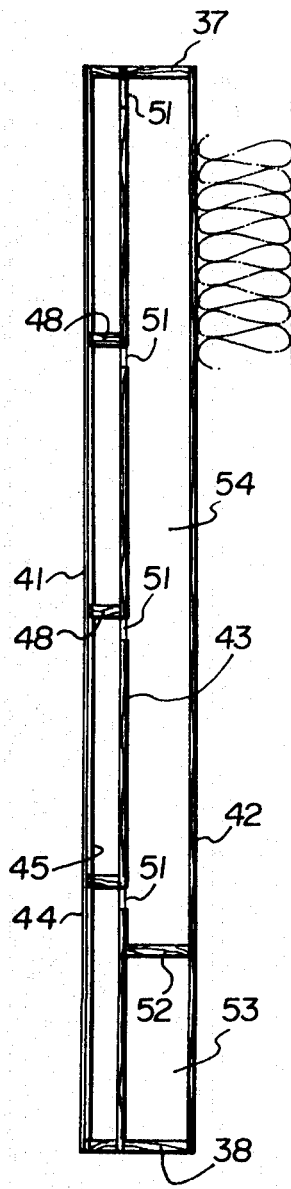
FIGS. 9 and 10 are cross-sectional views taken generally along line IX—IX and X—X, respectively of FIG. 8.
Figure 10:
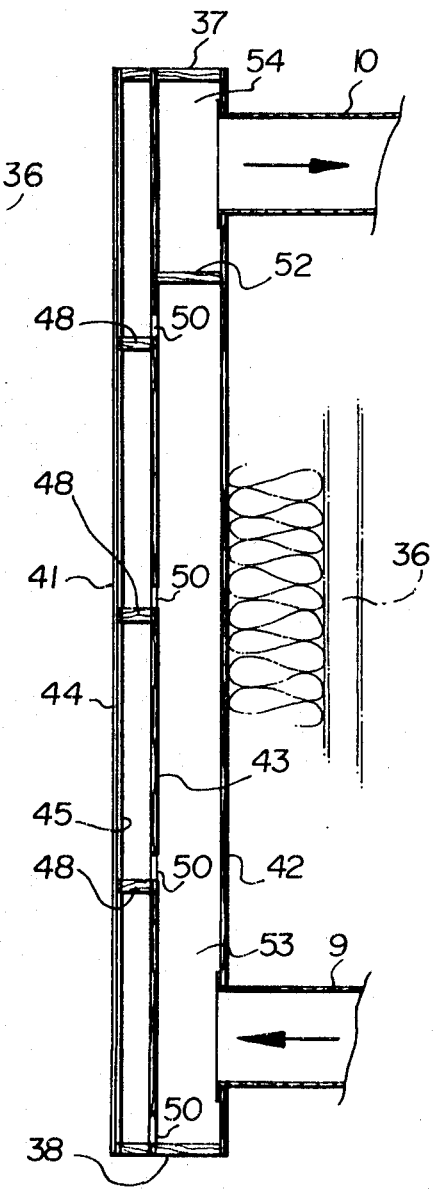
Figure 11:
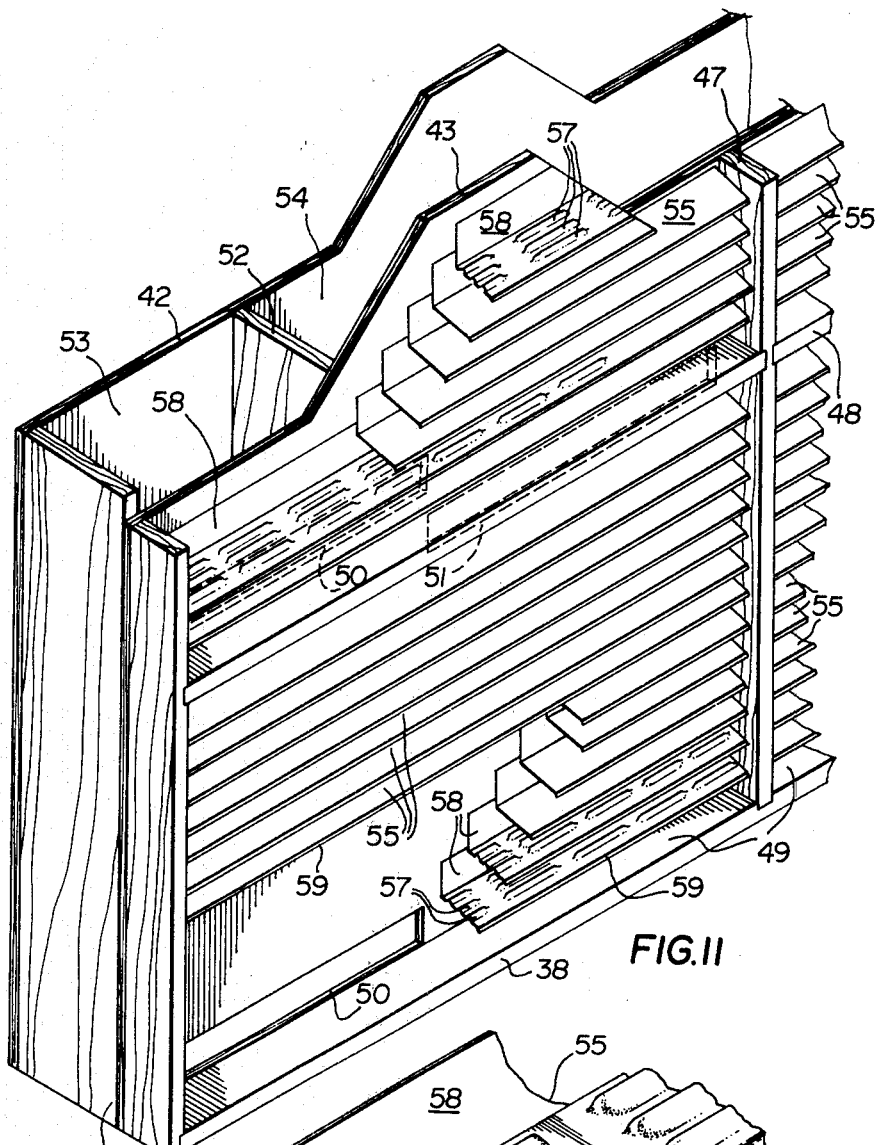
FIG. 11 is a partly sectioned perspective view of the lower lefthand corner of the solar collector of FIG. 8 on a larger scale.
Figure 13:
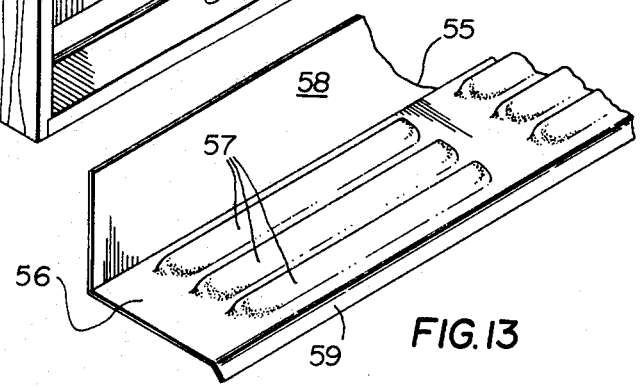
FIG. 13, which appears on the second last sheet of drawings with FIG. 11, is a perspective view of a portion of a heat exchanger fin used in the solar collector of FIGS. 8 to 12.

Referring now to FIGS. 8 to 12, air flowing through the damper 20 enters the solar collector 1 via the inlet or cold air return duct 9, which passes through an insulated wall 36 at the rear of the collector 1. The collector 1 is in the form of a rectangular parellelepipedic casing defined by top wall 37, bottom wall 38, side walls 39 and 40, a front wall 41 and a rear wall 42. The casing is divided longitudinally by an intermediate wall 43, which extends between the top and bottom walls 37 and 38, respectively, and between the side walls 39 and 40. The front wall 41 of the casing is defined by two plies 44 and 45 of solar glazing spaced a slight distance apart by vertical and horizontal spacers 46 (FIG. 12). The plies of solar glazing are fiberglass sheets.

Vertical and horizontal partitions 47 and 48, respectively extend between the front and intermediate walls 41 and 43, respectively to define a plurality of rectangular heating chambers 49. An inlet opening 50 is provided in one bottom rear corner of each chamber 49, i.e. in the intermediate wall 43. An outlet opening 51 is provided in one upper rear corner of each chamber 49. A continuous partition 52 extends between the rear and intermediate walls 42 and 43 defining an inlet manifold 53 and a discharge manifold 54. Of course, the partition is formed by separate vertical and horizontal sections, which are joined together to form a continuous wall. It will be noted that each of the inlet openings 50 communicates with the inlet manifold 53, and that each of the outlet openings 51 communicates with the discharge manifold 54. Moreover, the inlet and outlet openings 50 and 51, respectively are in diagonally opposite corners of the heating chamber 49, so that air travels the maximum distance while in the heating chambers.

Each heating chamber 49 contains a plurality of heat exchange fins 55 extending between the sides of the chamber. Each fin 55 is defined by an elongated, central, planar web portion 56 with the three rows of louvers or openings 57 extending along the length thereof. The fins 55 are attached to the intermediate wall by rear flanges 58 which also extend along the length of the web portion 56. The fins 55 are inclined forwardly, and the front or outer free end 59 of each fin curves downwardly. The use of partially covered openings 57 and downwardly curving front end 59 of the fins 55 increases turbulence and thus contact of air in the heating chambers 49 with the fins 55, thereby ensuring maximum heating of the air in the chambers 49.

While the casing of the solar heat collector has been described as being rectangular, it will be appreciated that the casing could be circular or some other shape. Accordingly, in at least the first of the appended claims, the side, top and bottom walls of the casing are all referred to as "side walls".

It will also be appreciated that some elements and materials used in the solar collector, and the structure of the collector can readily be changed. For example, the spacing between and the inclination of the heat exchange fins can be varied to suit the geographical location of the building and solar heating system.

OPERATION

In operation, air is circulated through the solar collector generally from bottom to top by the fan 17. Air from the fan 17 passes through the dehumidifier 18 and the automatic damper 20. The air used to collect heat is kept dry using the dehumidifier 18, and is maintained in a closed system. Because the heat collecting air is kept dry in a closed system, frost and condensation in the solar collector is avoided in colder climes. This improves the early morning performance of the solar collector. Air required to heat the building is drawn by the furnace 13 from air enclosed within the space surrounding the heat storage silos 7.

Air passing through the damper 20 and the inlet manifold 53 enters the heating chambers 49 via the inlet openings 50. Air in the chambers 49 passes upwardly through the slots 57 and around the front end of the fins 55. Solar heat collected by the fins 55 is transferred to the air during such upward passage and carried with the air through the outlet openings 41 to the discharge manifold 54. The heated air flows from the air discharge manifold 54 through the duct 10 and manifold 11 to the top end of the silos 7. During passage through the silos 7, the air heats the stones 8 and the silos 7. The air is then recycled in the manner described above.

There has thus been described a relatively simple, inexpensive solar heat collector and a system for use with such a collector.

I claim:

1. A solar heat collector for use in a solar heating apparatus of the type which utilizes air as a heat transfer medium comprising:
   (a) a rectangular casing, including:
      (i) a front wall,
      (ii) a rear wall,
      (iii) a pair of opposing side walls,
      (iv) a top wall, and
      (v) a bottom wall,
   the front wall being adapted to transmit solar heat to the interior of the casing;
   (b) an intermediate wall extending between the side walls;
   (c) first partitions interconnecting said front wall and said intermediate wall, said first partitions extending vertically between the top and bottom walls of the casing, and horizontally between the opposing side walls of the casing to define a plurality of rectangular heating chambers in the area between said front and intermediate walls;
   (d) second partitions extending between said intermediate wall and said rear wall dividing the area between said intermediate and rear walls into an air inlet manifold and an air discharge manifold;
(e) cold air inlet duct means in the bottom of said rear wall for introducing air into said air inlet manifold;
(f) air inlet openings in said intermediate wall connecting each heating chamber to said air inlet manifold;
(g) air outlet openings in said intermediate wall connecting each heating chamber to said air discharge manifold;
(h) a plurality of heat exchange fins in said heating chambers for receiving solar heat and transferring such heat to air passing from the air inlet opening to the air outlet opening in each heating chamber; and
(i) hot air outlet duct means in the top of said rear wall for discharging hot air from said air discharge manifold.

2. A solar collector according to claim 1, wherein said heat exchange fins are metal plates extending from said intermediate wall toward said front wall in each heating chamber; said plates including a plurality of rows of longitudinally extending slots facilitating the heating of air passing through said slots.

* * * * *